United States Patent
Ichikawa et al.

(10) Patent No.: US 12,483,622 B2
(45) Date of Patent: Nov. 25, 2025

(54) INTERMEDIATE APPARATUS, COMMUNICATION METHOD, AND PROGRAM

(71) Applicant: NTT, Inc., Tokyo (JP)

(72) Inventors: Junki Ichikawa, Musashino (JP); Hideki Nishizawa, Musashino (JP); Kenji Shimizu, Musashino (JP); Yukio Tsukishima, Musashino (JP); Toru Mano, Musashino (JP); Tomoya Hibi, Musashino (JP); Kiwami Inoue, Musashino (JP)

(73) Assignee: NTT, Inc., Tokyo (JP)

( * ) Notice: Subject to any disclaimer, the term of this patent is extended or adjusted under 35 U.S.C. 154(b) by 223 days.

(21) Appl. No.: 18/568,618

(22) PCT Filed: Jun. 10, 2021

(86) PCT No.: PCT/JP2021/022074
§ 371 (c)(1),
(2) Date: Dec. 8, 2023

(87) PCT Pub. No.: WO2022/259452
PCT Pub. Date: Dec. 15, 2022

(65) Prior Publication Data
US 2024/0146806 A1 May 2, 2024

(51) Int. Cl.
*H04L 67/1097* (2022.01)
(52) U.S. Cl.
CPC .................. *H04L 67/1097* (2013.01)
(58) Field of Classification Search
CPC .................................................. H04L 67/1097
See application file for complete search history.

(56) References Cited

U.S. PATENT DOCUMENTS

| 8,964,581 B2 | 2/2015 | Takara et al. |
| 2012/0221669 A1 | 8/2012 | Hashimoto |

(Continued)

FOREIGN PATENT DOCUMENTS

| JP | 2013-255185 | 12/2013 |
| WO | WO 2011/058640 | 5/2011 |

OTHER PUBLICATIONS

[No Author Listed], "Developing a Linux Kernel module using RDMA for GPUDirect, Application Guide," Nvidia TB-06712-001_v11.3, Apr. 2021, 29 pages.

(Continued)

*Primary Examiner* — Viet D Vu
(74) *Attorney, Agent, or Firm* — Fish & Richardson P.C.

(57) ABSTRACT

An intermediate device 10A includes a transfer unit 11 that transfers a request including data to be transmitted from a local 30 to a remote 50, and a generation unit 12 that generates a pseudo-response to the request and returns the pseudo-response to the local 30. The intermediate device 10B includes a discard unit 13 that discards a response to the request from the remote 50. An intermediate device 20B includes a generation unit 22 that generates a pseudo-request based on an initial request for requesting data transmission from the local 30 to the remote 50 and transmits the pseudo-request to the remote 50, and a transfer unit 24 that transfers a response including data to be transmitted from the remote 50 to the local 30. The intermediate device 20A includes the discard unit 21 that discards a subsequent request from the local 30.

7 Claims, 14 Drawing Sheets

(56) References Cited

U.S. PATENT DOCUMENTS

| | | | | |
|---|---|---|---|---|
| 2013/0238685 A1* | 9/2013 | Aziz | ................. | H04M 1/72403 |
| | | | | 709/203 |
| 2016/0124877 A1* | 5/2016 | Hefty | ...................... | G06F 13/28 |
| | | | | 710/308 |
| 2017/0168876 A1* | 6/2017 | Tummala | ................ | G06F 9/524 |
| 2017/0302526 A1* | 10/2017 | Chen | ....................... | H04L 67/14 |

OTHER PUBLICATIONS

[No Author Listed], "InfiniBand Architecture Specification Volume 1, Release 1.2.1," InfiniBandSM Trade Association, Nov. 2007, 1727 pages.

[No Author Listed], "NVM Express over Fabrics Revisions 1.1," NVM Express, Oct. 2019, 83 pages.

Kumar et al., "Swift: Delay is Simple and Effective for Congestion Control in the Datacenter," In Proceedings of SIGCOMM 2020, online, Aug. 10-14, 2020, 514-528.

Netone.co.jp [online], "Improving user experience with TCP optimization," Sep. 2017, retrieved on Oct. 2023, retrieved from URL<https://www.netone.co.jp/knowledge-center/blog-column/knowledge_takumi_143/>, 20 pages (with English translation).

\* cited by examiner

INTERMEDIATE APPARATUS, COMMUNICATION METHOD, AND PROGRAM

CROSS-REFERENCE TO RELATED APPLICATIONS

This application is a National Stage application under 35 U.S.C. § 371 of International Application No. PCT/JP2021/022074, having an International Filing Date of Jun. 10, 2021.

The disclosure of the prior application is considered part of the disclosure of this application, and is incorporated by reference in its entirety into this application.

TECHNICAL FIELD

The present invention relates to an intermediate apparatus, a communication method, and a program.

BACKGROUND ART

Remote direct memory access (RDMA) used for a transport layer of InfiniBand (Non Patent Literature 1) is a communication protocol for performing high-speed and highly reliable data transfer between communication terminals at a distance. Since RDMA directly accesses a memory area of a reception terminal from a memory area of a transmission terminal, high-speed communication is possible. The RDMA has a credit-based flow control function, and also performs a completion control of confirming completion of data transfer and proceeding with processing, and thus reliable communication can be performed. RDMA is also used as a transport method for data communication between a solid state drive (SSD) and a graphics processing unit (GPU) in a host-to-device or device-to-device manner.

As illustrated in FIG. 1, RDMA is a communication model in which a queue pair (QP) is configured between a local server and a remote server and data is transferred using the QP. A QP is a set of a send queue (SQ) and a receive queue (RQ). The communication unit of RDMA is a communication request called a work request (WR), and is loaded into the SQ/RQ in a unit of a work queue element (WQE). The WR includes a Send WR which is a transmission request and a Receive WR which is a reception request. In the Send WR, a memory area in which data is desired to be transmitted is designated within a WQE and loaded into the SQ. In the Receive WR, a memory area in which data is desired to be received is designated within a WQE and loaded into the RQ. The WQE can be loaded into the SQ/RQ by first-in-first-out (FIFO), up to the queue size of the SQ/RQ. When the WR processing is normally completed between the QP, a completion queue entry (CQE) indicating normal completion is loaded into a completion queue (CQ) corresponding to each of the SQ/RQ. When WR processing ends with an error between the QP, a CQE indicating an error is loaded into a CQ. When confirming the CQE of normal completion, the WQE in the SQ/RQ is deleted, and the next WR can be accepted.

CITATION LIST

Non Patent Literature

Non Patent Literature 1: InfiniBand Architecture Specification Volume 1, Release 1.4, April 2020

SUMMARY OF INVENTION

Technical Problem

Advances in communication technologies may enable the provision of networks with high-bandwidth, long-distance connectivity. For example, it is conceivable to envision a scenario in which transponders, currently used in optical transmission systems, are incorporated into client-server systems, communicating with a server of a communication partner without undergoing electrical-optical conversion during transmission. In addition, in optical transmission systems, a technology has been proposed in which an optimum transmission mode (modulation scheme, baud rate, number of carriers, and the like) is selected from a network state (distance, signal quality, and the like) to establish a high-speed transmission path with less network resources (frequency and the like). This technology could realize long-distance and high-speed communication between communication terminals using a small amount of network resources and terminal resources.

There is a problem that the transfer performance of the RDMA degrades as the networks becomes longer. This is because a longer transfer time is required in an extended line, and a next packet cannot be transmitted until a packet notifying completion of data transfer is received in a connection-type protocol. In particular, in the connection-type service type, in order to complete the WQE at the local side, it is necessary to receive the ACK from the remote side and wait for the CQE to be issued. When the request and response between the local and the remote take longer, the incomplete WQE stays in the SQ/RQ, and thus the number of WQEs that cannot be loaded into the queue while waiting for processing increases and the transfer performance degrades.

The present invention has been made in view of the above problem, and an object thereof is to realize high-band data transfer even on a network service having a large round trip time (RTT).

Solution to Problem

According to an aspect of the present invention, there is provided an intermediate device disposed between a first device and a second device that transfer data using remote direct memory access, the intermediate device including: a transfer unit that transfers a request including data to be transmitted from the first device to the second device; a generation unit that generates a pseudo-response to the request and returns the pseudo-response to the first device; and a discard unit that discards a response to the request from the second device.

According to another aspect of the present invention, there is provided an intermediate device disposed between a first device and a second device that transfer data using remote direct memory access, the intermediate device including: a generation unit that generates a pseudo-request for requesting data transmission from the first device to the second device, based on an initial request for requesting data transmission from the first device to the second device, and transmits the pseudo-request to the second device; a transfer unit that transfers a response including data to be transmitted from the second device to the first device; and a discard unit that discards a subsequent request from the first device.

According to still another aspect of the present invention, there is provided a communication method performed by an intermediate device disposed between a first device and a second device that transfer data using remote direct memory access, the method including: transferring a request including data to be transmitted from the first device to the second device; generating a pseudo-response to the request and returning the pseudo-response to the first device; and discarding a response to the request from the second device.

According to still another aspect of the present invention, there is provided a communication method performed by an intermediate device disposed between a first device and a second device that transfer data using remote direct memory access, the method including: generating a pseudo-request for requesting data transmission from the first device to the second device, based on an initial request for requesting data transmission from the first device to the second device, and transmitting the pseudo-request to the second device; transferring a response including data to be transmitted from the second device to the first device; and discarding a subsequent request from the first device.

Advantageous Effects of Invention

According to the present invention, high-band data transfer can be realized even on a network service with a large RTT.

DESCRIPTION OF EMBODIMENTS

[Regarding RDMA]

The service types of RDMA are roughly divided into four types including Reliable Connection (RC), Reliable Datagram (RD), Unreliable Connection (UC), and Unreliable Datagram (UD) according to the classification of Reliable/Unreliable and Connection/Datagram. RC and UD are commonly used.

RC ensures the sequence and delivery of messages by utilizing a mechanism for acknowledging of the success/failure of communication by ACK/NAK and for retransmission. In addition, RC is also a connection type, and performs one-to-one communication between local-remote QP.

Although the UD does not have a mechanism for acknowledgement and retransmission, many-to-many communication such as transmitting to a plurality of QPs and receiving from a plurality of QPs is possible by specifying the destination for each communication.

Operation types in RDMA are roughly divided into four types: SEND, RDMA WRITE (with Immediate), RDMA READ, and ATOMIC Operations. In RC, all of these can be used. Only SEND can be used in the UD.

The retransmission control in RDMA is classified into three patterns of a case where ACK/NAK is not received, a case where Receiver-Not-Ready (RNR) NAK is received, and a case where out-of-sequence NAK is received. If an ACK or NAK is not received from the remote side within a certain period of time, the local side retransmits as a timeout. In addition, the remote side returns RNR NAK if WQE cannot be prepared in RQ. If the RNR NAK is received from the remote side, the local side retransmits after a certain period of time. Further, the remote side returns an out-of-sequence NAK if a packet sequence number (PSN) of the received packet is not in order. If the out-of-sequence NAK is received from the remote side, the local side retransmits without waiting.

[Operation of RDMA]

Next, some operations of which the service type is RC will be described.

Figure 1:
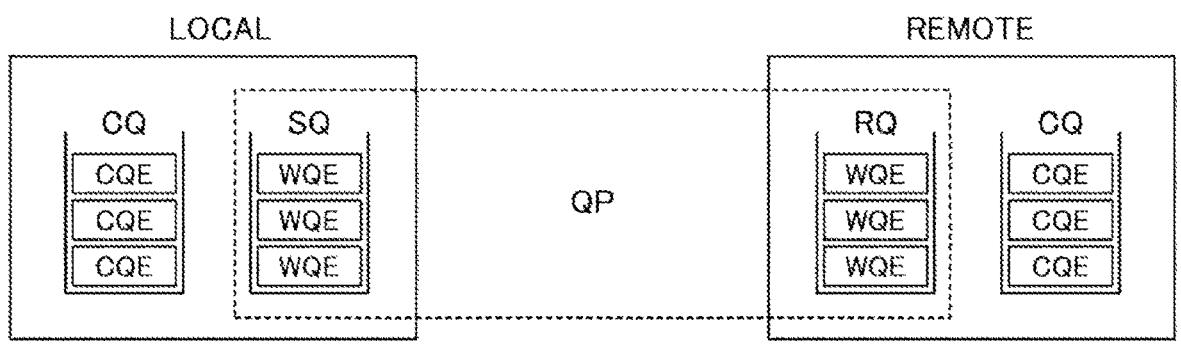
FIG. 1 is a diagram for describing a communication model of RDMA.
Figure 2:
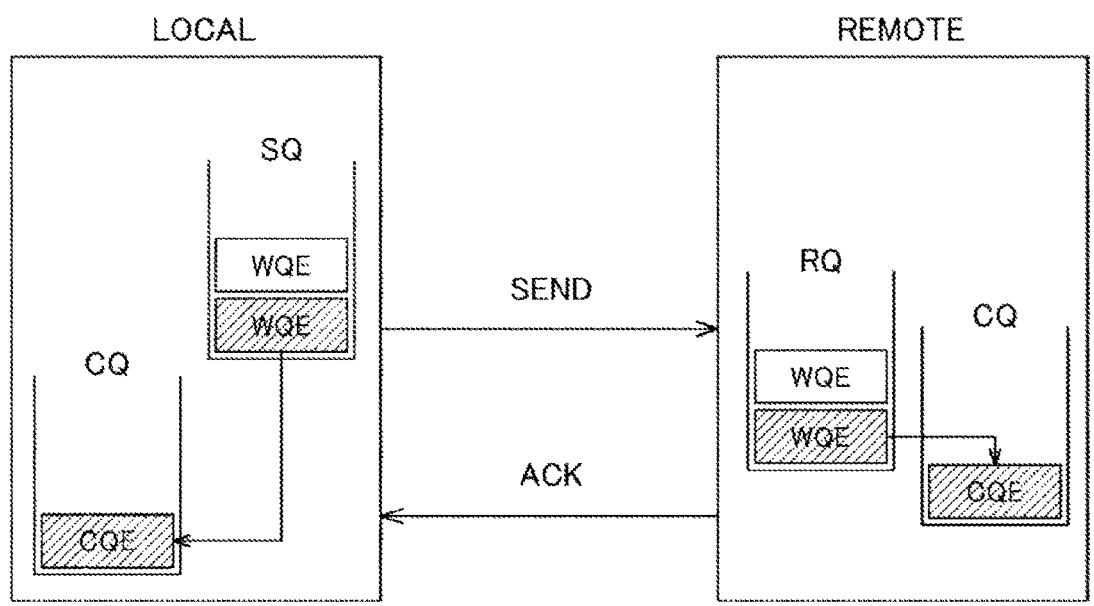
FIG. 2 is a diagram for explaining SEND of RDMA.

First, SEND of an RDMA operation will be described with reference to FIG. 2. SEND is a basic transmission and reception model of RDMA, and transmits data from the local to the remote.

The local prepares an SQ, the remote prepares an RQ, and the local and the remote load WQEs into the SQ and the RQ, respectively.

When the communication is ready, the local transmits the data using SEND. When the data is successfully received, the remote loads the CQE into the CQ, releases the WQE in the RQ, and returns the ACK to the local. When receiving the ACK, the local loads the CQE into the CQ and releases the WQE in the SQ.

In addition, SEND w/Imm (SEND with Immediate), which is a special operation, is prepared for SEND. In SEND w/Imm, a special field (imm_data) can be set in the WQE in the SQ of the local, and imm_data can be simultaneously transmitted at the time of data transmission from the local to the remote. When the data is successfully received, the remote loads the CQE including imm_data into the CQ. On the remote, the content of imm_data can be known by referring to the CQE.

Figure 3:
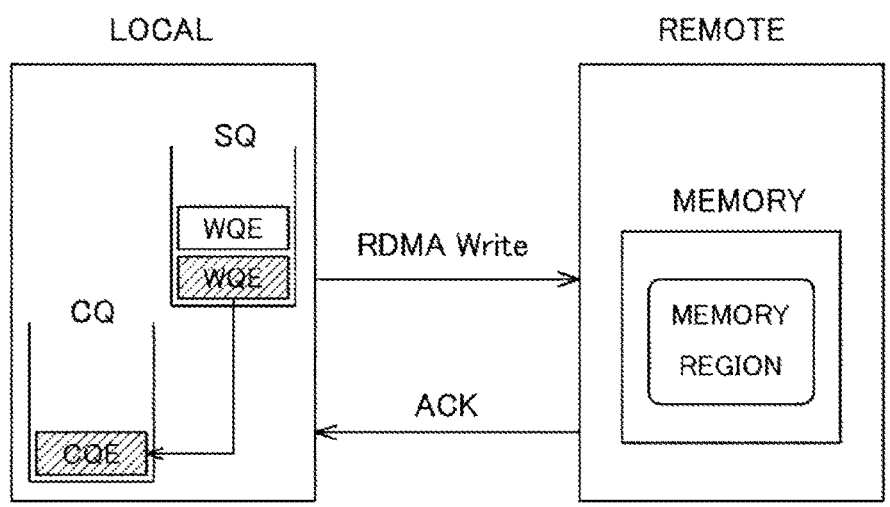
FIG. 3 is a view for explaining RDMA WRITE of RDMA.

Next, RDMA WRITE of the RDMA operation will be described with reference to FIG. 3. RDMA WRITE is a method of transmitting data from the local to the remote similarly to SEND, but is different in that data is directly transferred to a memory area of the remote.

The local prepares SQ and loads WQE therein. In WQE, a memory area of data desired to be transmitted and a memory area of the remote desired to be written are set. The remote secures a memory area for RDMA, but it is not necessary to load WQE into RQ.

When the communication is ready, the local transmits the data using RDMA WRITE. Data is directly written to a memory area of the remote. The remote returns an ACK to the local when the data is successfully received. When receiving the ACK, the local loads the CQE into the CQ and releases the WQE in the SQ.

Next, RDMA WRITE w/Imm (RDMA WRITE with Immediate) of the RDMA operation will be described with reference to FIG. 4. RDMA WRITE has a disadvantage that the remote cannot detect the change of the memory area at the time of data reception. In the RDMA WRITE w/Imm, the remote prepares RQ, loads WQE into the RQ, and loads the CQE into the CQ when data is successfully received, thereby detecting a change in the memory area. In the WQE in the SQ of the local, a memory area of data desired to be transmitted, a memory area of the remote desired to be written, and a special field (imm_data) are set. When the data is successfully received, the remote loads the CQE including imm_data into the CQ, releases the WQE in the RQ, and returns an ACK to the local. The remote can detect a change in any memory area using the CQE.

Figure 5:
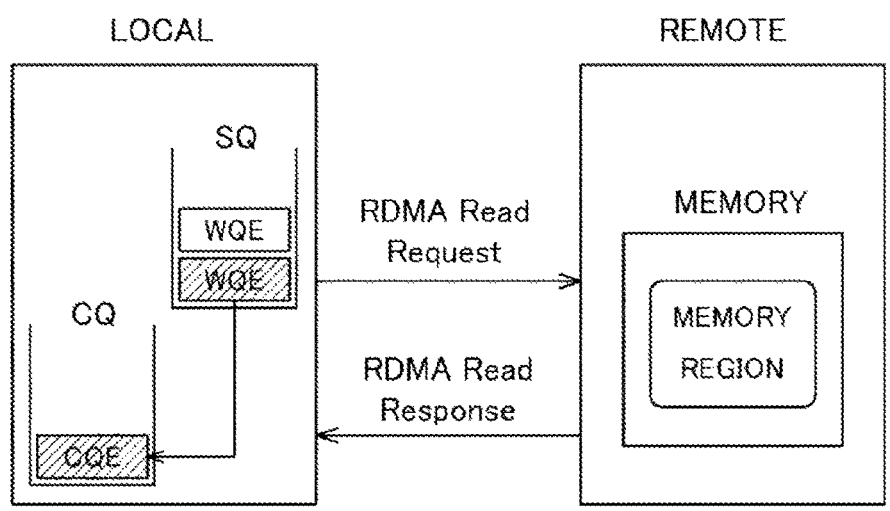
FIG. 5 is a diagram for explaining RDMA READ of RDMA.

Next, referring to FIG. 5, RDMA READ of RDMA operations will be described. RDMA READ is a method of drawing data from the remote to the local.

The local prepares SQ and loads WQE therein. In WQE, a memory area of the local in which data is desired to be received and a memory area of the remote in which data is desired to be read are set. The remote secures a memory area for RDMA, but it is not necessary to load WQE into RQ.

When the communication is ready, the local requests data reading using RDMA Read Request. When receiving the request, the remote directly transmits the data from the memory area of the remote to the designated memory area of the local using RDMA Read Response. The RDMA Read Response includes an ACK extension header. When receiving this ACK, the local loads the CQE into the CQ and releases the WQE in the SQ.

Figure 6:
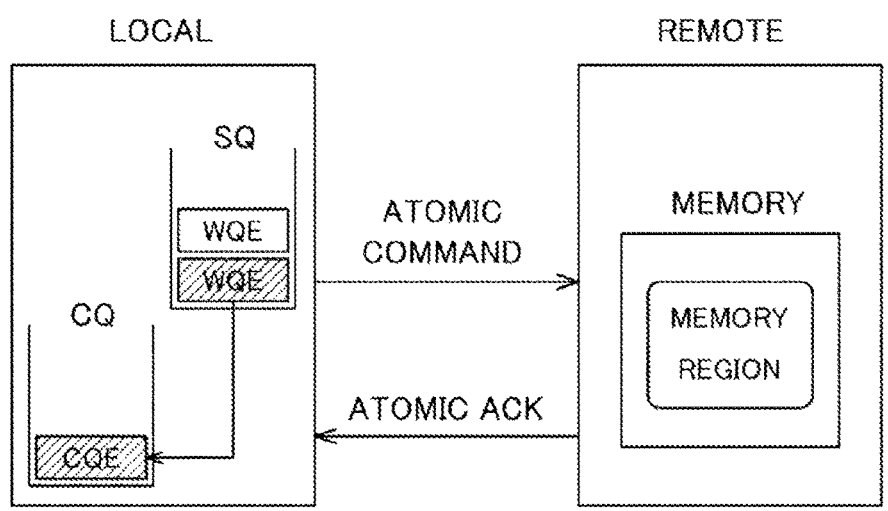
FIG. 6 is a diagram for explaining ATOMIC Operations of RDMA.

Subsequently, ATOMIC Operations of RDMA operation will be described with reference to FIG. 6. ATOMIC Operations are methods in which a memory operation of Fetch and Add (FetchAdd) or Compare and Swap (CmpSwap) is performed on a memory area of the remote to load memory contents before the operation into the local. FetchAdd is an operation of adding the value of any 64 bit field to the content of any memory address of the remote. CmpSwap is an operation of changing the value to the value of a new 64 bit field in a case where the content of any memory address of the remote is the same as the value of the specified 64 bit field.

The local prepares SQ and loads WQE therein. In WQE, a memory area of the local in which data is desired to be received, a memory area of the remote in which operation is desired to be performed, and operation contents (FetchAdd or CmpSwap and arguments thereof) are set. The remote secures a memory area for RDMA, but it is not necessary to load WQE into RQ.

When the communication is ready, the local transmits an ATOMIC Command (FetchAdd or CmpSwap). When receiving the command, the remote performs an ATOMIC operation on the designated memory area of the local and returns the pre-operation data by ATOMIC ACK. When receiving this ACK, the local loads the CQE into the CQ and releases the WQE in the SQ.

[Configuration of Communication System]

Figure 7:
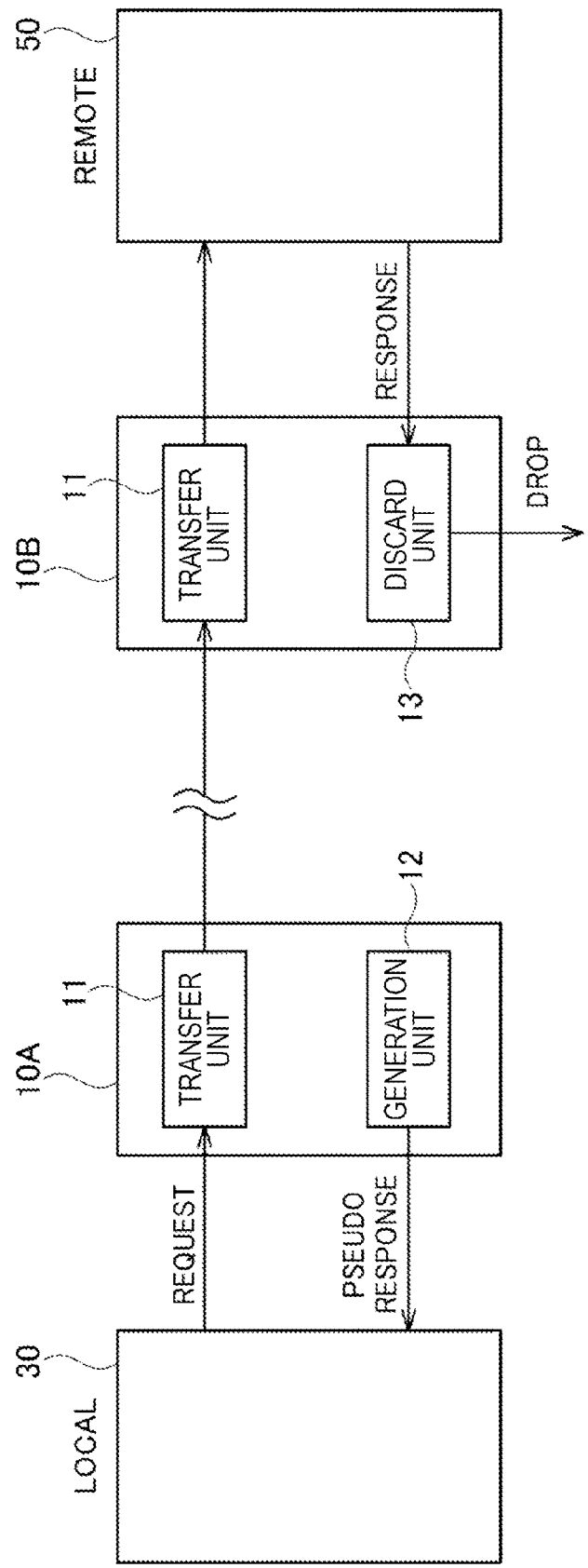
FIG. 7 is a diagram illustrating an example of a configuration of a communication system including intermediate devices of the present embodiment.

Next, an example of a configuration of a communication system including the intermediate devices 10A and 10B of the present embodiment will be described with reference to FIG. 7. The intermediate devices 10A and 10B are disposed between a local 30 and a remote 50 that transfer data using RDMA. More specifically, the intermediate device 10A is disposed in a preceding stage of the long-distance network on the local 30 side, and the intermediate device 10B is disposed in a preceding stage of the long-distance network on the remote 50 side. The intermediate device 10A returns the pseudo-response to the local 30, and the intermediate device 10B discards the response from the remote 50.

The intermediate device 10A includes a transfer unit 11 and a generation unit 12.

The transfer unit 11 receives a request from the local 30 and transfers the request to the remote 50. The request is, for example, the above-described SEND, SEND w/Imm, RDMA WRITE, RDMA WRITE w/Imm, or ATOMIC Command. The request includes data to be transmitted from the local 30 to the remote 50, or an operation on data.

The generation unit 12 picks up the request transmitted from the local 30 and flagged as Only or Last, and generates a pseudo-response by using the PSN included in the request. The generation unit 12 returns the generated pseudo-response to the local 30. Note that the same PSN value as that of the Only or Last request is used for the ACK for the request.

When receiving the pseudo-response, the local 30 recognizes it as a response from the remote 50, loads the CQE into the CQ, and normally completes the processing. As a result, the WQE in the SQ of the local 30 can be forcibly released.

The intermediate device 10B includes the transfer unit 11 and a discard unit 13.

Similarly to the transfer unit 11 of the intermediate device 10A, the transfer unit 11 transfers the request transmitted from the local 30 to the remote 50.

The discard unit 13 discards the true-response to the request from the remote 50. As a result, it is possible to prevent duplicate reception of the response in the local 30. Furthermore, since there is a possibility that a malfunction is caused when NAK by RNR or out-of-sequence transmitted from the remote 50 arrives at the local 30, the discard unit 13 also discards these NAKs.

Note that the intermediate device 10A may include the discard unit 13, and the intermediate device 10B may not be disposed.

[Operation of Communication System]

Figure 8:
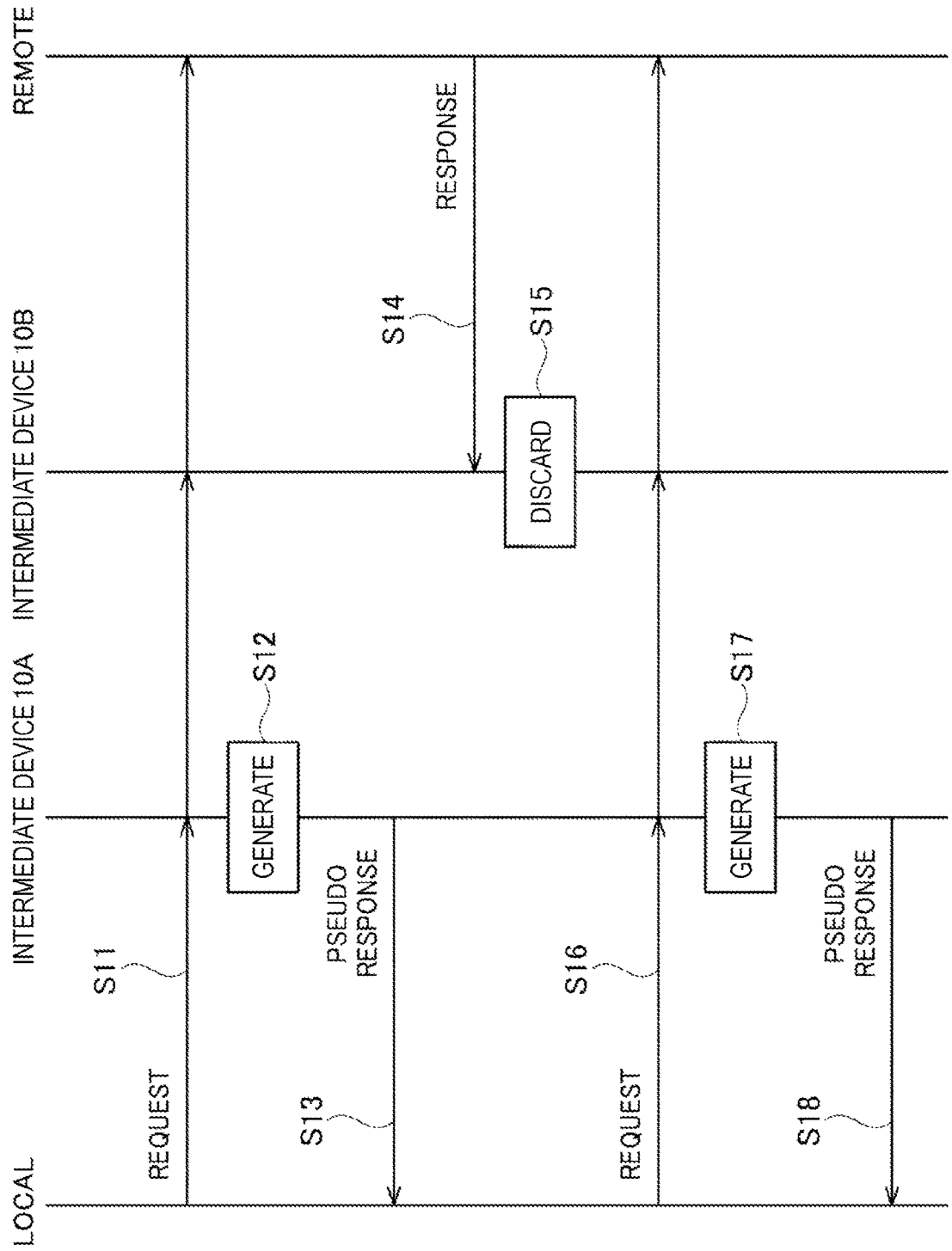
FIG. 8 is a sequence diagram illustrating one example of a processing flow of a communication system of FIG. 7.

Next, an example of a processing flow of a communication system including the intermediate devices 10A and 10B will be described with reference to a sequence diagram of FIG. 8.

In step S11, the local 30 loads the WQE into the SQ and transmits a request to the remote 50. The request is transferred to the remote 50 via the intermediate devices 10A and 10B.

In step S12, the intermediate device 10A generates a pseudo-response using the PSN included in the request. In step S13, the intermediate device 10A returns the pseudo-response to the local 30. When receiving the pseudo-response, the local 30 loads the CQE into the CQ and releases the WQE in the SQ.

Thereafter, when the local 30 loads the WQE into the SQ and transmits a request to the remote 50 (step S16), the intermediate device 10A generates a pseudo-response when transferring the request and returns the pseudo-response to the local 30 (step S17). When receiving the pseudo-response, the local 30 loads the CQE into the CQ, releases the WQE in the SQ, and then loads the WQE into the SQ to transmit a request to the remote 50 (step S18).

On the other hand, when the request (data) is successfully received, the remote 50 transmits a response to the local 30 in step S14.

In step S15, the intermediate device 10B discards the received response.

Thereafter, when receiving the request, the remote 50 returns a response, and the intermediate device 10B discards the response.

[Another Communication System]

Figure 9:
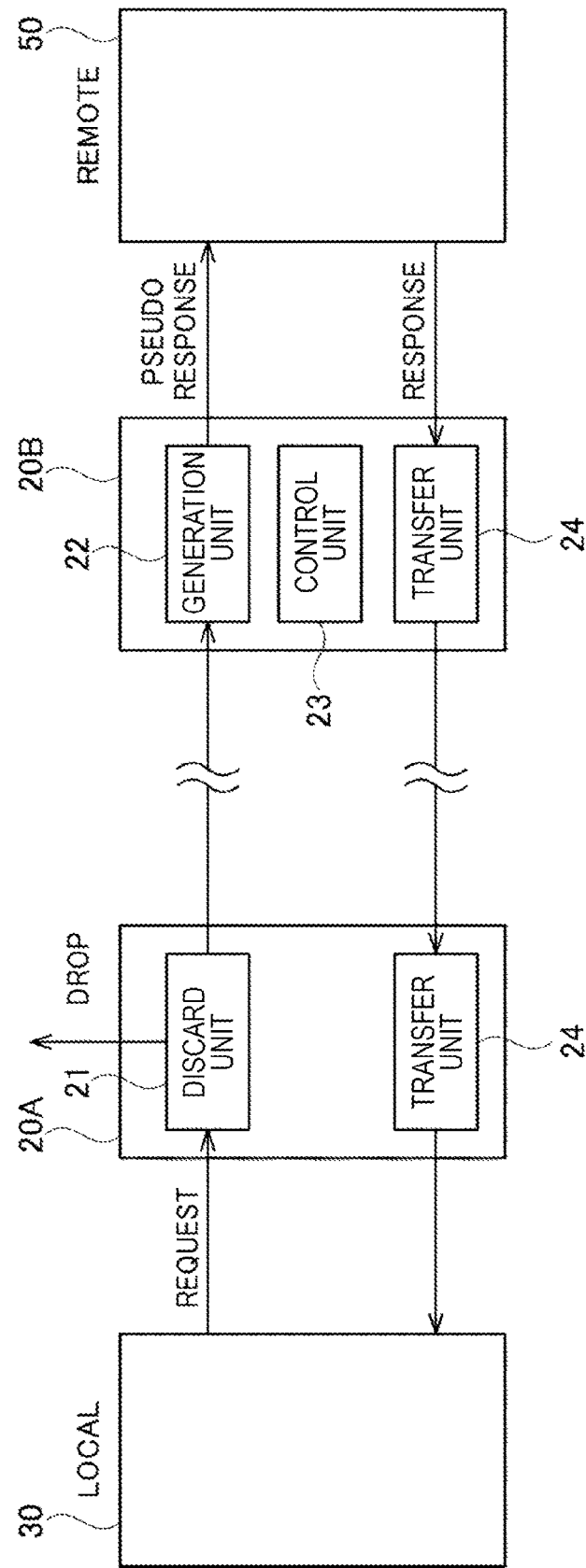
FIG. 9 is a diagram illustrating an example of a configuration of the communication system including other intermediate devices of the present embodiment.

Next, an example of a configuration of a communication system including other intermediate devices 20A and 20B of the present embodiment will be described with reference to FIG. 9. The intermediate devices 20A and 20B are disposed between the local 30 and the remote 50 that transfer data using RDMA. More specifically, the intermediate device 20A is disposed in a preceding stage of the long-distance network on the local 30 side, and the intermediate device 20B is disposed in a preceding stage of the long-distance network on the remote 50 side. The intermediate device 20A discards the request from the local 30, and the intermediate device 20B transmits the pseudo-request to the remote 50.

The intermediate device 20A includes a discard unit 21 and a transfer unit 24.

The discard unit 21 transfers the initial request (request of Only or First) from the local 30 to the remote 50, and discards the subsequent request from the local 30. Thus, duplicate reception of requests at the remote 50 can be prevented.

The transfer unit 24 transfers a response returned from the remote 50 to the local 30. The response includes data to be transmitted from the remote 50 to the local 30.

The intermediate device 20B includes a generation unit 22, a control unit 23, and a transfer unit 24.

The generation unit 22 picks up the initial request from the local 30, and generates a pseudo-request by using a destination QPN (QP Number) included in RDMA extended transport header (RETH) and base transport header (BTH).

The generation unit 22 generates the pseudo-request such that the number, which obtained by subtracting the number of responses returned by the remote 50 from the number of requests transmitted to the remote 50, does not exceed the queue size of the SQ of the local 30. The PSN of the pseudo-request is determined by calculating the number of requests per 1 WQE based on the DMA Length of the RETH of the request and the PSH of the BTH and incrementing the PSN by the calculated number.

When receiving the pseudo-request, the remote 50 recognizes it as a request from the local 30, extracts data from the memory area, and transmits a response to the local 30. As a result, data can be transmitted from the remote 50 without waiting for a request from the local 30.

The control unit 23 checks the pseudo-request sent to the remote 50 and the response returned by the remote 50, inspects whether or not the expected length and number of responses are returned, and controls the generation timing of the pseudo-request of the generation unit 22.

Similarly to the transfer unit 24 of the intermediate device 20A, the transfer unit 24 transfers a response returned from the remote 50 to the local 30.

Note that the intermediate device 20B may include the discard unit 21, and the intermediate device 20A may not be disposed.

[Operation of Another Communication System]

Figure 10:
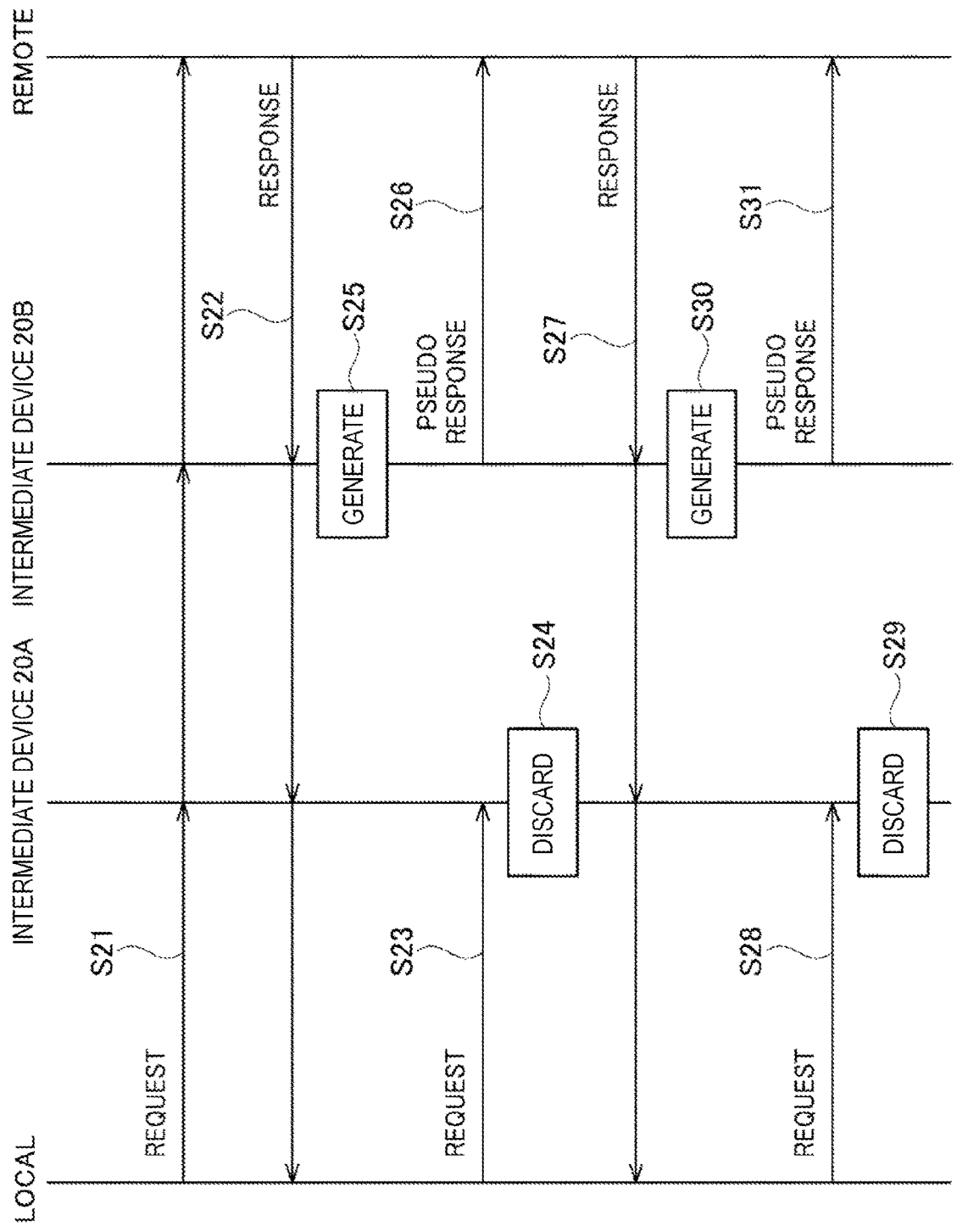
FIG. 10 is a sequence diagram illustrating one example of a processing flow of the communication system of FIG. 9.

Next, an example of a processing flow of a communication system including the intermediate devices 20A and 20B will be described with reference to a sequence diagram of FIG. 10.

In step S21, the local 30 loads the WQE into the SQ and transmits an initial request to the remote 50. The intermediate device 20A transfers the initial request to the remote 50 side without discarding the initial request. The intermediate device 20B acquires QPN included in the initial request.

When receiving the request, the remote 50 returns a response to the local 30 in step S22. When receiving the response, the local 30 loads the CQE into the CQ and releases the WQE in the SQ.

In step S23, the local 30 loads the WQE into the SQ and transmits a subsequent request to the remote 50.

In step S24, the intermediate device 20A discards the subsequent request from the local 30.

On the other hand, the intermediate device 20B generates a pseudo-request in step S25, and transmits the pseudo-request to the remote 50 in step S26. The intermediate device 20B controls the generation timing of the pseudo-request such that the local 30 can correctly receive the response returned by the remote 50.

When receiving the pseudo-request, the remote 50 returns a response including data to the local 30 in step S27.

Thereafter, when receiving the response corresponding to the pseudo-request, the local 30 loads the CQE into the CQ, releases the WQE in the SQ, and then loads the WQE into the SQ to transmit a subsequent request to the remote 50 (step S28). The intermediate device 20A discards the subsequent request from the local 30 (step S29).

The intermediate device 20B generates a pseudo-request at a predetermined timing (step S30), and transmits the pseudo-request to the remote 50 (step S31).

[Resolution of Destination QPN]

In the interface of RDMA, the QP has a different QPN for each endpoint. The SQ/RQ recognizes the opposite QPN, and includes the destination QPN in the header when generating the RDMA packet. However, QPN of the transmission source is not included in the header. When the intermediate device 10A generates a pseudo-response, since the received request does not include the information indicating the QPN of the transmission source, the destination of the pseudo-response is unknown. Therefore, in the present embodiment, the destination of the pseudo-response is specified by the following two methods.

Figure 11:
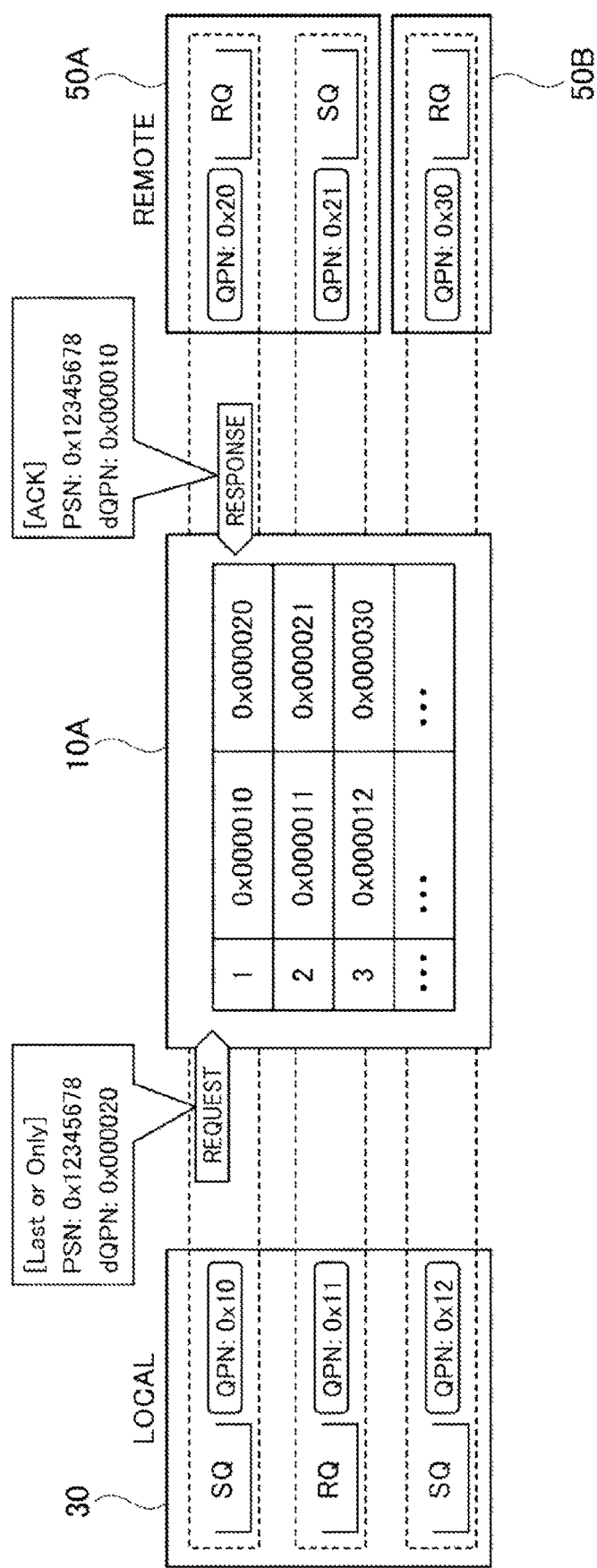
FIG. 11 is a diagram for explaining an example of a method of creating a table and resolving a destination QPN of a response.

A first method is a method of inspecting an exchange of an original RDMA request and response and storing a combination of QPNs in a table. The same PSN is used for the ACK and for the Only or Last request of the RDMA packet. Therefore, the intermediate device 10A inspects the passing request and response, and adds the destination QPN of the header of each of the Only or Last request and the ACK having the same PSN to the table as a combination. In the example of FIG. 11, since destination QPNs of the headers of the request and the response, both having the same PSN, are 0x000020 and 0x000010, respectively, a combination of 0x000010 and 0x000020 is added to the table. In FIG. 11, the local 30 constitutes QPs between the remote 50A and the remote 50B.

When the intermediate device 10A generates a pseudo-response, a combination of QPNs including the destination QPN of the request is acquired from the table, and the other QPN of the combinations is set as the destination QPN of the pseudo-response. For example, when receiving a request of which destination QPN is 0x000020, the intermediate device 10A acquires a combination of 0x000010 and 0x000020 including 0x000020 from the table, and sets 0x000010 to the destination QPN of the pseudo-response.

Figure 12:
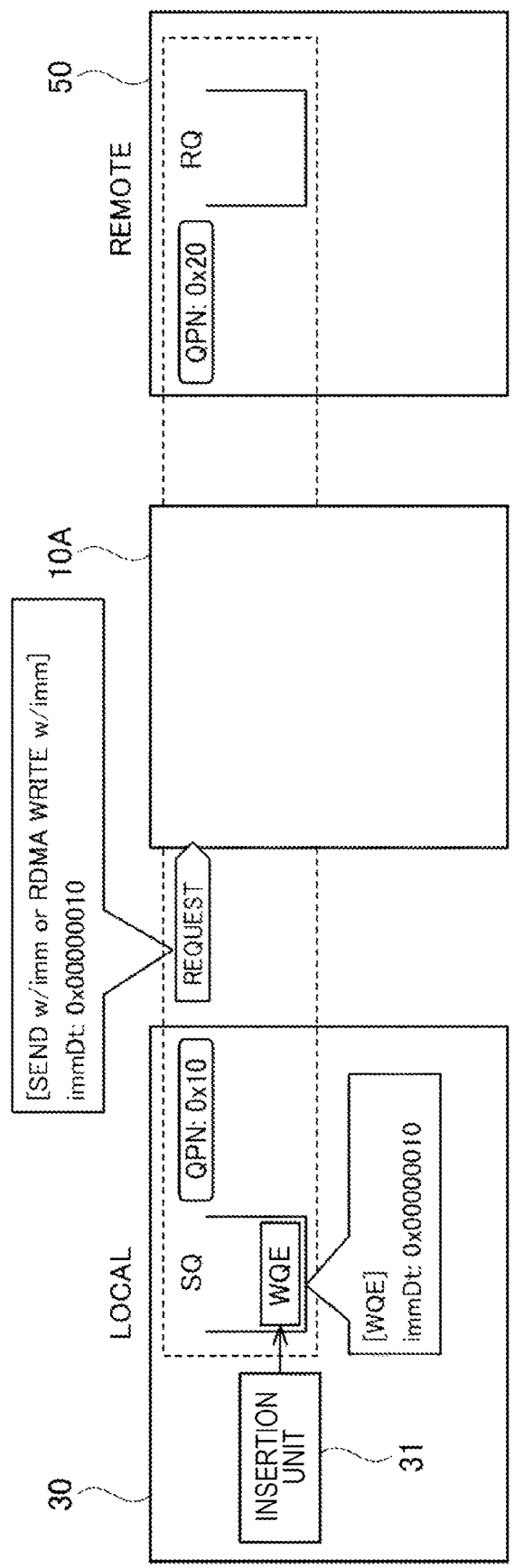
FIG. 12 is a diagram for describing an example of a method of notifying a source QPN and resolving a destination QPN of a response.

A second method is a method of placing Source QPN in an RDMA packet. A 32 bit immediate data (immDt) field exists in WQE, and any 32 bit information can be described in the immDt field only for SEND with intermediate or RDMA WRITE with intermediate. In FIG. 12, the local 30 includes an insertion unit 31, and the insertion unit 31 writes the QPN of the SQ at the local 30 side into the immDt field of the WQE in the SQ at the local 30 side.

When the intermediate device 10A generates a pseudo-response, the QPN written in the immDt field of the received request is set to the destination QPN of the pseudo-response.

EXAMPLE

Next, an example in which the intermediate device of the present embodiment is applied to each operation of RDMA will be described.

First, an example in which the present embodiment is applied to SEND illustrated in FIG. 2 will be described. The intermediate devices 10A and 10B in FIG. 7 can be used for SEND.

When the local 30 transmits a SEND Only, the intermediate device 10A transfers the SEND Only to the remote 50 side, creates a pseudo-response (ACK) from the SEND Only header, and returns the pseudo-response to the local 30. When receiving the pseudo-response, the local 30 loads the CQE into the CQ and releases the WQE in the SQ.

The remote 50 returns an ACK to the local 30 side when the data is successfully received. The intermediate device 20B discards the ACK from the remote 50.

Next, an example in which the present embodiment is applied to RDMA WRITE illustrated in FIG. 3 will be described. The intermediate devices 10A and 10B in FIG. 7 can be used for RDMA WRITE.

When the local 30 transmits data by RDMA WRITE, the intermediate device 10A transfers data to the remote 50 side, creates a pseudo-response (ACK) from the RDMA WRITE header, and returns the pseudo-response to the local 30. When receiving the pseudo-response, the local 30 loads the CQE into the CQ and releases the WQE in the SQ.

The remote 50 returns an ACK to the local 30 when the data is successfully received. The intermediate device 10B discards the ACK from the remote 50.

Figure 4:
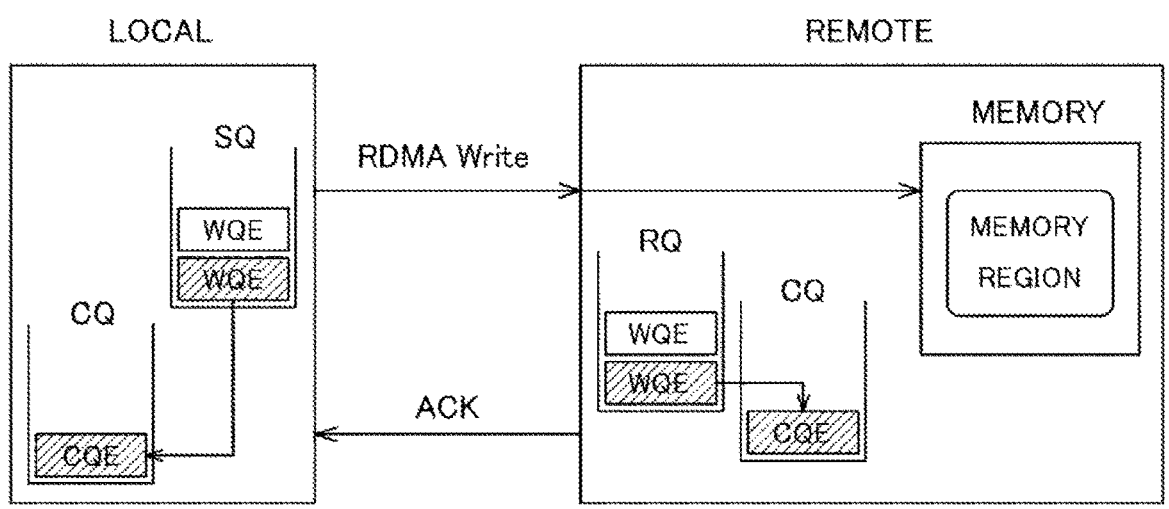
FIG. 4 is a diagram for explaining RDMA WRITE with Immediate of RDMA.

RDMA WRITE w/Imm illustrated in FIG. 4 can also be applied similarly to RDMA WRITE.

Next, an example in which the present embodiment is applied to RDMA READ illustrated in FIG. 5 will be described. The intermediate devices 20A and 20B in FIG. 9 can be used for RDMA READ.

When the local 30 requests data reading by RDMA Read Request, the intermediate device 20A transfers the initial request to the remote 50 without discarding the initial request.

When receiving the request, the remote 50 returns a response to the local 30. The intermediate devices 20A and 20B transfer the response to the local 30.

The intermediate device 20B classifies the request as completed or incomplete based on the status of the response, and estimates the vacancy of the SQ of the local 30. The intermediate device 20B newly creates a number of pseudo-requests (pseudo RDMA Read Requests) equivalent to the vacancy of the SQ, and transmits these pseudo-requests to the remote 50. The intermediate device 20B repeats creation and transmission of pseudo-requests until the request is classified as completed based on the response status.

When the data is successfully received, the local 30 loads the CQE into the CQ, releases the WQE in the SQ, loads a new WQE into the SQ, and transmits a new request to the remote 50. The intermediate device 20A discards the request from the local 30.

Next, an example in which the present embodiment is applied to ATOMIC Operations illustrated in FIG. 6 will be described. In ATOMIC Operations, the operation is different between a case where the pre-operation data of the remote 50 may be discarded and a case where the local 30 receives the pre-operation data.

First, a case where the pre-operation data may be discarded will be described. In a case where the pre-operation data may be discarded in ATOMIC Operations, the intermediate devices 10A and 10B in FIG. 7 can be used.

When the local 30 transmits an ATOMIC command, the intermediate device 10A transfers the ATOMIC command to the remote 50 side, creates a pseudo-response (ATOMIC ACK) from the header of the ATOMIC command, and returns the pseudo-response to the local 30. When receiving the pseudo-response, the local 30 loads the CQE into the CQ and releases the WQE in the SQ.

When receiving the ATOMIC command, the remote 50 performs an ATOMIC operation and returns the pre-operation data by the ATOMIC ACK. The intermediate device 10B discards the ATOMIC ACK from the remote 50.

Next, a case where the local 30 receives the pre-operation data will be described. In a case where the local 30 receives the pre-operation data, the intermediate devices 20A and 20B in FIG. 9 can be used.

When the local 30 transmits an ATOMIC command, the intermediate devices 20A and 20B transfer the ATOMIC command to the remote 50.

When receiving the ATOMIC command, the remote 50 performs an ATOMIC operation and returns the pre-operation data by ATOMIC ACK. The intermediate devices 20A and 20B transfer the ATOMIC ACK to the local 30.

The intermediate device 20B classifies the request as completed or incomplete based on the status of the response, and estimates the vacancy of the SQ of the local 30. The intermediate device 20B newly creates a number of pseudo-requests (pseudo ATOMIC Commands) equivalent to the vacancy of the SQ, and transmits these pseudo-requests to the remote 50. The intermediate device 20B repeats creation and transmission of pseudo-requests until the request is classified as completed based on the response status.

When the ATOMIC ACK is successfully received, the local 30 loads the CQE into the CQ, releases the WQE in the SQ, loads a new WQE into the SQ, and transmits a new ATOMIC Command to the remote 50. The intermediate device 20A discards the ATOMIC command from the local 30.

As described above, the intermediate device 10A of the present embodiment includes the transfer unit 11 that transfers a request including data to be transmitted from the local 30 to the remote 50, and the generation unit 12 that generates a pseudo-response to the request and returns the pseudo-response to the local 30. The intermediate device 10B includes the discard unit 13 that discards a response to the request from the remote 50. Since the local 30 releases the WQE in the SQ in response to the pseudo-response from the intermediate device 10A, even when the RTT between the local 30 and the remote 50 is large, it is possible to realize high-band data transfer without waiting for a response from the remote 50.

The intermediate device 20B of the present embodiment includes the generation unit 22 that generates a pseudo-request based on an initial request for requesting data transmission from the local 30 to the remote 50 and transmits the pseudo-request to the remote 50, and the transfer unit 24 that transfers a response including data to be transmitted from the remote 50 to the local 30. The intermediate device 20A includes the discard unit 21 that discards the subsequent request from the local 30. Since the remote 50 transmits data in response to the pseudo-request from the intermediate device 20B, even in a case where the RTT between the local 30 and the remote 50 is large, it is possible to realize high-band data transfer without waiting for a request from the local 30.

Figure 13:
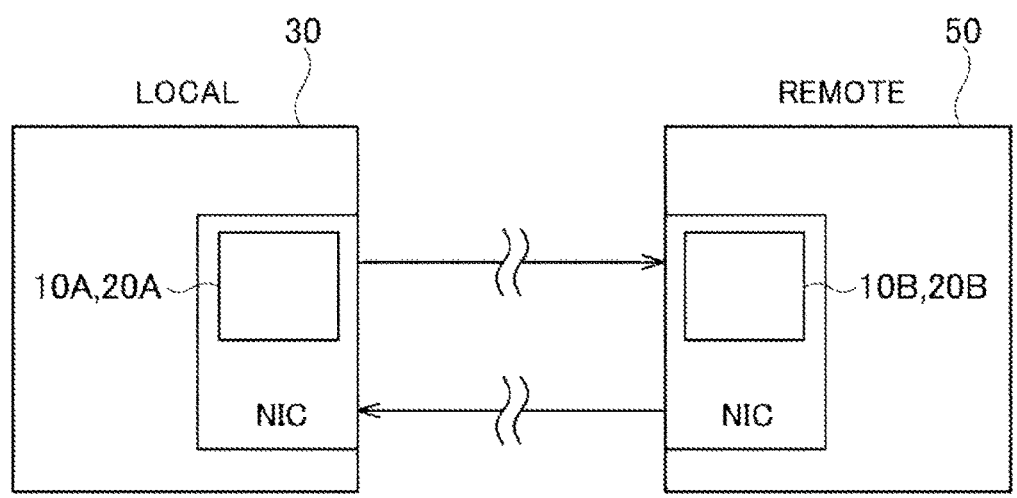
FIG. 13 is a diagram illustrating an example in which the intermediate device is configured on an NIC.

Although the configuration in which the intermediate devices 10A, 10B, 20A, and 20B are installed between the local 30 and the remote 50 has been described above, as illustrated in FIG. 13, the intermediate devices 10A and 20A may be configured on a network interface card (NIC) of the device of the local 30, and the intermediate devices 10B and 20B may be configured on the NIC of the device of the remote 50.

In addition, the intermediate devices 10A, 10B, 20A, and 20B may be configured by a physical server or may be configured by a virtual server. A network device such as a switch or a router may include the functions of the intermediate devices 10A, 10B, 20A, and 20B.

An intermediate device having the function of the intermediate device 10A and the function of the intermediate device 10B may be disposed on the local 30 side, or an intermediate device having the function of the intermediate device 20A and the function of the intermediate device 20B may be disposed on the remote 50 side. Alternatively, the intermediate device 10A including the discard unit 13 may be disposed on the local 30 side, and the intermediate device 20B including the discard unit 21 may be disposed on the remote 50 side.

Figure 14:
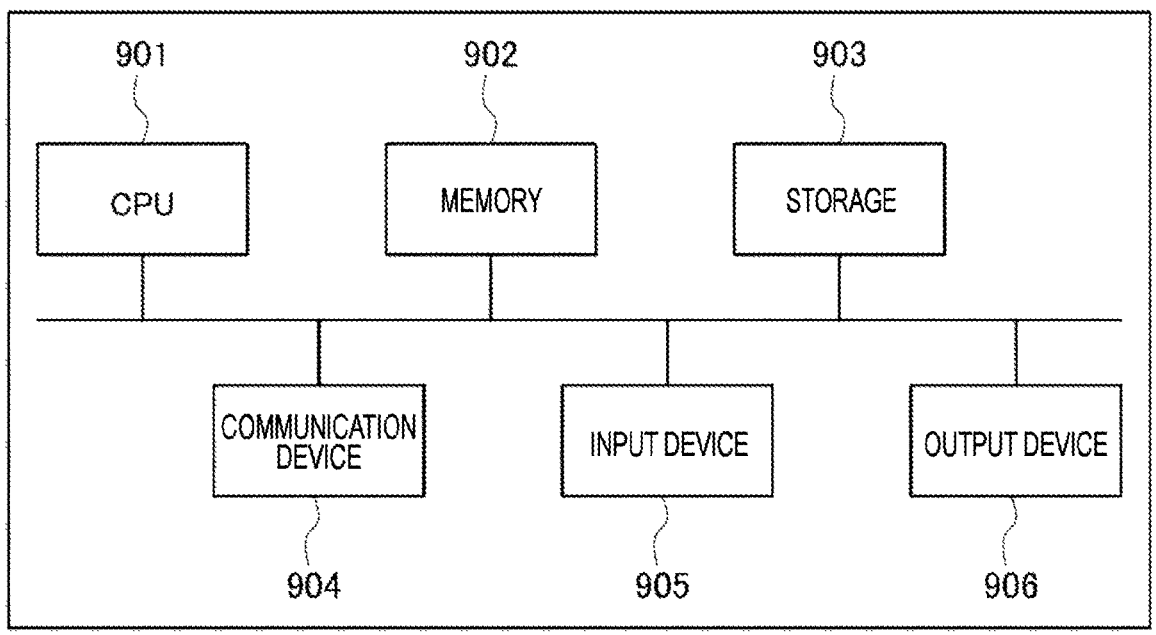
FIG. 14 is a diagram illustrating an example of a hardware configuration of the intermediate device.

For example, as illustrated in FIG. 14, a general-purpose computer system including a central processing unit (CPU) 901, a memory 902, a storage 903, a communication device 904, an input device 905, and an output device 906 can be used as the intermediate devices 10A, 10B, 20A, and 20B described above. In this computer system, the CPU 901 executes a predetermined program loaded into the memory 902, thereby realizing the intermediate devices 10A, 10B, 20A, and 20B. This program can be recorded on a computer-readable recording medium such as a magnetic disk, an optical disc, or a semiconductor memory, or can be distributed via a network.

REFERENCE SIGNS LIST 10A, 10B, 20A, 20B Intermediate device
11 Transfer unit
12 Generation unit
13 Discard unit
21 Discard unit
22 Generation unit
23 Control unit
24 Transfer unit
30 Local
50 Remote

The invention claimed is:

1. An intermediate device disposed between a first device and a second device that transfer data using remote direct memory access, the intermediate device comprising:
   a transfer unit, including one or more processors, configured to transfer a request including data to be transmitted from the first device to the second device;
   a generation unit, including one or more processors, configured to generate a pseudo-response to the request and returns the pseudo-response to the first device; and
   a discard unit, including one or more processors, configured to discard a response to the request from the second device.

2. The intermediate device according to claim 1, wherein
   a table is created in which destinations of each of requests and responses having the same identifier are combined from requests and responses transmitted and received between the first device and the second device; and
   the generation unit acquires a combination including a destination of the request from the table, and sets a destination corresponding to the destination of the request in the combination as a destination of the pseudo-response.

3. The intermediate device according to claim 1, wherein
   the request includes a transmission source of the request, and
   the generation unit sets a transmission source of the request included in the request as a destination of the pseudo-response.

4. An intermediate device disposed between a first device and a second device that transfer data using remote direct memory access, the intermediate device comprising:
   a generation unit, including one or more processors, configured to generate a pseudo-request for requesting data transmission from the first device to the second device, based on an initial request for requesting data transmission from the first device to the second device, and transmits the pseudo-request to the second device;
   a transfer unit, including one or more processors, configured to transfer a response including data to be transmitted from the second device to the first device; and
   a discard unit, including one or more processors, configured to discard a subsequent request from the first device.

5. A communication method performed by an intermediate device disposed between a first device and a second device that transfer data using remote direct memory access, the method comprising:
   generating a pseudo-request for requesting data transmission from the first device to the second device, based on an initial request for requesting data transmission from the first device to the second device, and transmitting the pseudo-request to the second device;
   transferring a response including data to be transmitted from the second device to the first device; and
   discarding a subsequent request from the first device.

6. A non-transitory computer readable storage medium having stored there on a program for causing one or more processors of the intermediate device according to claim 1.

7. A non-transitory computer readable storage medium having stored there on a program for causing one or more processors of the intermediate device according to claim 4.

* * * * *